United States Patent
Megalingam et al.

(10) Patent No.: US 10,674,667 B2
(45) Date of Patent: Jun. 9, 2020

(54) METHOD AND APPARATUS FOR WIRELESS NETWORK-BASED CONTROL OF A ROBOTIC MACHINE

(71) Applicant: Amrita Vishwa Vidyapeetham, Tamil Nadu (IN)

(72) Inventors: Rajesh Kannan Megalingam, Kerala (IN); P. Venkat Rangan, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 235 days.

(21) Appl. No.: 15/868,197

(22) Filed: Jan. 11, 2018

(65) Prior Publication Data
US 2019/0069483 A1   Mar. 7, 2019

(51) Int. Cl.
| | |
|---|---|
| *A01D 46/30* | (2006.01) |
| *A01D 46/253* | (2006.01) |
| *B25J 11/00* | (2006.01) |
| *B25J 5/02* | (2006.01) |
| *B25J 5/00* | (2006.01) |
| *B25J 13/06* | (2006.01) |
| *B25J 13/00* | (2006.01) |
| *B25J 19/02* | (2006.01) |

(52) U.S. Cl.
CPC .......... *A01D 46/30* (2013.01); *A01D 46/253* (2013.01); *B25J 5/007* (2013.01); *B25J 5/02* (2013.01); *B25J 11/0045* (2013.01); *B25J 13/006* (2013.01); *B25J 13/06* (2013.01); *B25J 19/023* (2013.01); *Y10S 901/02* (2013.01)

(58) Field of Classification Search
CPC ...... A01D 46/20; A01D 46/24; A01D 46/253; A01D 46/30; B25J 5/007; B25J 5/02; B25J 11/0045; B25J 13/006; B25J 13/06; B25J 19/023; A01G 23/0955; Y10S 901/02

See application file for complete search history.

(56) References Cited

U.S. PATENT DOCUMENTS

| | | | | |
|---|---|---|---|---|
| 3,117,401 | A * | 1/1964 | Talley | B24B 23/08 451/415 |
| 4,123,782 | A * | 10/1978 | Kitahara | H04N 5/232 348/211.6 |
| 4,279,281 | A * | 7/1981 | Nakamura | A01G 23/0955 144/24.13 |
| 5,438,793 | A * | 8/1995 | Eliachar | A01D 46/20 144/208.2 |
| 6,474,377 | B1 * | 11/2002 | Van De Mortel | A01G 23/0955 144/208.2 |

(Continued)

*Primary Examiner* — Alicia Torres
*Assistant Examiner* — Adam J Behrens
(74) *Attorney, Agent, or Firm* — Donald R. Boys; Central Coast Patent Agency LLC (57) ABSTRACT

A harvesting system has a climbing unit with a body driven by traction wheels, a control unit, an articulated arm with a cutting implement at an extremity, a video camera focused on the cutting implement, and a computerized portable control station having a display and a user interface with inputs operable to control driving the traction wheels of the climbing unit, the articulation of the articulated arm, and the cutting implement. Video streamed in real time from the video camera is displayed on the display screen, and a user viewing the video display operates the inputs to position the cutting implement to cut a stem of a fruit or nut in the tree.

7 Claims, 7 Drawing Sheets

(56) References Cited

U.S. PATENT DOCUMENTS

| | | | |
|---|---|---|---|
| 7,997,311 B2* | 8/2011 | Prout, Jr. | A01G 23/0955 144/208.2 |
| 8,307,865 B1* | 11/2012 | Cuffel | A01G 23/0955 144/208.1 |
| 8,517,066 B1* | 8/2013 | Van De Mortel | B27L 1/06 144/24.13 |
| 9,370,142 B2* | 6/2016 | Barnhill | A01G 23/0955 |
| 10,021,840 B2* | 7/2018 | Stout | A01G 23/0955 |
| 2006/0150602 A1* | 7/2006 | Stimmann | A01D 46/30 56/10.5 |
| 2006/0213167 A1* | 9/2006 | Koselka | A01D 46/30 56/10.2 A |
| 2007/0181217 A1* | 8/2007 | Ahdoot | A01G 23/0955 144/208.2 |
| 2009/0277536 A1* | 11/2009 | Scott | A01G 23/0955 144/24.13 |
| 2013/0284869 A1* | 10/2013 | Helenius | A01G 23/0955 248/218.4 |
| 2013/0299046 A1* | 11/2013 | Helenius | A01G 23/0955 144/343 |
| 2018/0017965 A1* | 1/2018 | Kosa | A01B 69/004 |
| 2018/0257774 A1* | 9/2018 | Volpi | B25J 11/00 |
| 2019/0029178 A1* | 1/2019 | Russel | A01D 46/30 |
| 2019/0299398 A1* | 10/2019 | Svensson | B25J 11/008 |

* cited by examiner

METHOD AND APPARATUS FOR WIRELESS NETWORK-BASED CONTROL OF A ROBOTIC MACHINE

CROSS-REFERENCE TO RELATED DOCUMENTS

The present application claims priority to application No. 201741031217, filed in India on Sep. 4, 2017. All disclosure of the Indian parent application is incorporated in the instant application, at least by reference.

BACKGROUND OF THE INVENTION

1. Field of the Invention

The present invention is in the field of agriculture, more specifically, fruit and nut harvesting robotics, and pertains particularly to methods and apparatus for remotely controlling a robotic harvester to ascend a fruit or nut tree and to harvest fruit or nuts therefrom.

2. Discussion of the State of the Art

In the field of agriculture, machine harvesters have been developed for aiding in the harvest of certain fruits and nuts. The characteristics and capabilities of such machines typically are dependent upon the specific tasks envisioned, including the type of fruit or nut harvested. One area that lends to needed development in robotic harvesting is the harvesting of coconuts. In agriculture generally, coconut harvesting plays an important role in the economy of a region because of its domestic, commercial, and industrial uses. The demand for coconuts increases yearly as more uses are determined for some part of the nut meat, husk, shell, and kernel.

As the demand for coconuts has remained high, available human resources for manually harvesting coconuts have remained scarce. Therefore, automated and semi-automated machinery have been developed for coconut harvesting. Because a coconut tree has a cylindrical trunk that is typically void of branches, it is rather to climb, compared to many other trees. There are machines available that may be carried by a climber to help the climber climb the tree with more ease.

Robotic machines known to the inventor, but necessarily known to the public, have been developed that use DC motors and servo technologies that replace slower more cumbersome, and less maintainable pneumatics robots used by machines in the current art.

What is clearly needed is a control system and application for remotely controlling a robotic harvester machine, including directing the machine to climb a tree and to cut or otherwise separate the fruit or nuts targeted for harvest.

BRIEF SUMMARY OF THE INVENTION

In one embodiment of the present invention a harvesting system is provided, comprising a climbing unit with a circular body surrounding a trunk of a tree, the circular body having remotely-driven traction wheels within the circular body, the wheels bearing on the trunk from different directions, and first control circuitry, including wireless communication circuitry, for receiving control signals and driving the traction wheels, an upwardly extending post joined to the circular body of the climbing unit, external to the body, an articulated arm extending from the upwardly-extending post at an upper extremity, the robotic arm comprising a plurality of jointed segments and a cutting implement at an extremity of the articulated arm away from the upwardly-extending post, and second control circuitry, including wireless communication circuitry, for receiving control signals articulating the arm and positioning the cutting implement, and a video camera mounted to the articulated arm in proximity to the cutting implement, focused on the cutting implement, wherein the articulated arm, cutting implement, video camera, and climbing unit comprise a first controllable harvesting robot, and a computerized portable control station having a display screen and executing coded instructions, and a user interface having inputs operable to control driving the traction wheels of the climbing unit, the articulation of the articulated arm, and the cutting implement. Video streamed in real time from the video camera is displayed on the display screen, and a user viewing the video display operates the inputs to position the cutting implement to cut a stem of a fruit or nut in the tree.

In one embodiment of the system the inputs are electromechanical inputs. Also in one embodiment the inputs are virtual inputs displayed on a touch screen. Also in one embodiment the upwardly extending post is joined to the circular body by mechanism enabling the post to be repositioned around the circumference of the circular body, and the user interface comprises inputs for controlling the movement of the upwardly-extending post around the circumference of the circular body. And in one embodiment the upwardly-extending post is joined to the circular body by mechanism enabling the post to be extended upward to an upper limit or retracted downward to a lower limit.

In one embodiment the video camera is mounted to the articulated arm by mechanism enabling the video camera to be aimed within a variety of viewpoints, and wherein focus is adjustable, and the user interface comprises inputs for controlling the viewpoint and focus of the video camera. Also in one embodiment the computerized portable control station comprises inputs for controlling elements of two or more controllable harvesting robots, each engaged at a different tree, the user interface having inputs for selecting an individual one of the harvesting robots to control. And in one embodiment the computerized portable control station is a smart telephone or computerized pad device.

DETAILED DESCRIPTION OF THE INVENTION

In various embodiments described in enabling detail in this specification, the inventor provides a unique robotic harvester, including apparatus and functionality for controlling the robotic harvester over a wireless network. The present invention is described in enabling detail using the following examples, which may describe more than one relevant embodiment falling within the scope of the present invention.

Figure 1:
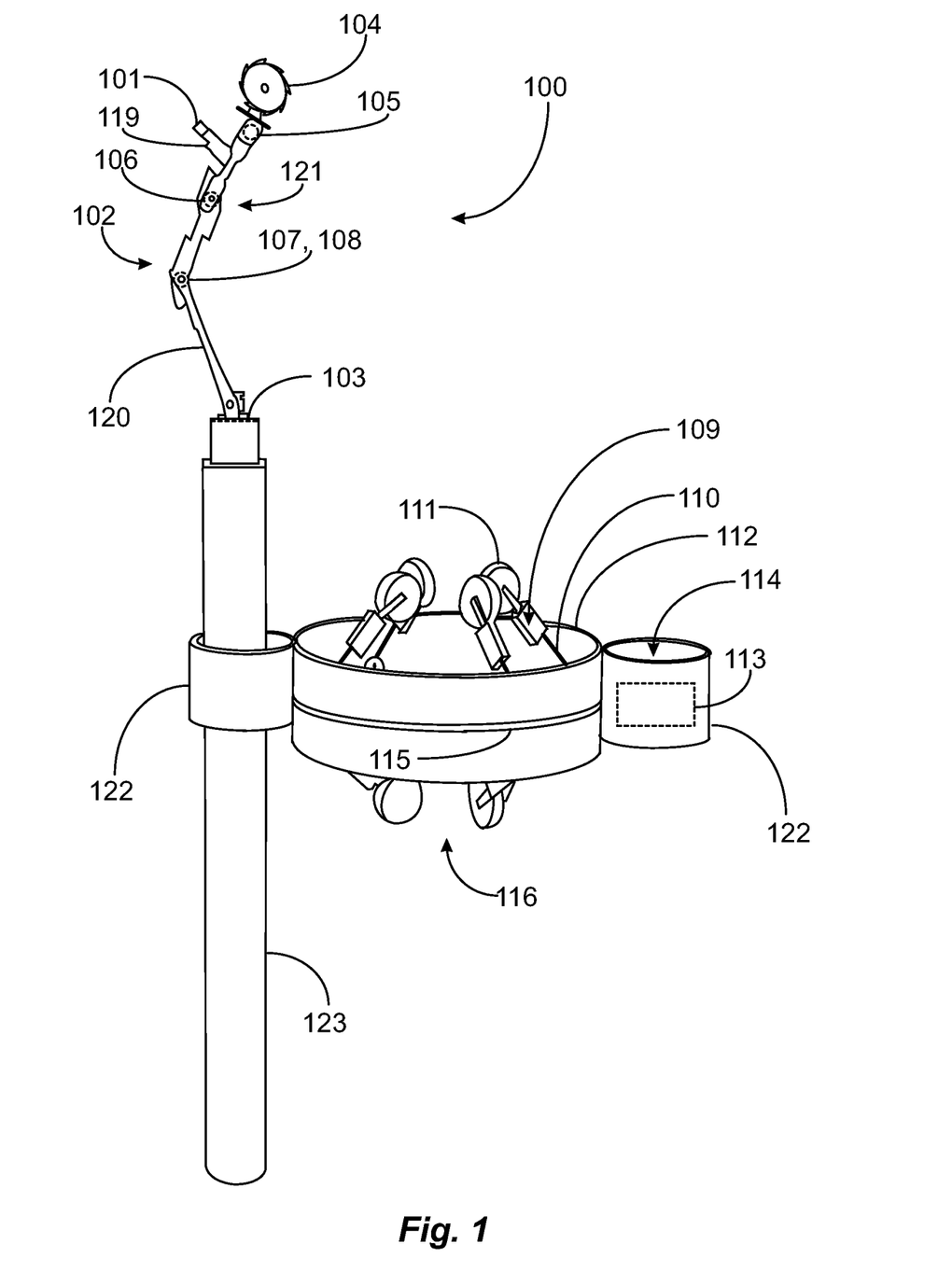
FIG. 1 is an elevation view of a robotic harvester.

FIG. 1 is an elevation view of a robotic harvester 100. Robotic Harvester 100 is a climbing robot capable of moving up and down a cylindrical tree trunk, such as a trunk of a coconut tree, using a machine body 116 for climbing function. Machine body 116 is connected, in this example, to an extendable base rod 123, which culminates at an upper extremity in an attached robotic arm 102. Robotic arm 102 includes a base arm 120 connected to a direct current (DC) motor 103 at an upper extremity of base rod 123. Base arm 120 may include links, joints, motors, actuators, and joint detecting sensors. Robotic arm 102 includes, in this example, a control arm 121 consisting of two or more jointed linear sections that are connected via servo motors 105, 106, 107, and 108 to enable full rotation and articulation of the robotic arm.

Control arm 121 may, in various embodiments, include a microcontroller processing unit, a digital memory, a power unit, such as a rechargeable battery or power cell, a wireless interface, joint detecting sensors, and motor drivers. In one aspect, a user might access electronics in control arm 121 via a plug-and-play cable or by a wireless control interface, and may program robotic functions, switch modes, or update software. Control arm 121 includes an end effector, in this case a robotic cutting tool 104, for slicing through coconut stems. Control arm 121 further includes a video camera 101 and a collision or contact sensor 119 to detect when cutter 104 is in contact with a coconut stem. Video camera 101 includes a wireless transmitter for sending live video feed to a ground station or to a remote mobile device having a display for displaying the video to an operator controlling the arm remotely using a control application.

Base rod 123 may extend up and down telescopically, and robotic arm 102 may be rotated 360 degrees. A body ring 112 includes a peripheral outer groove 115 enabling outer rings 122 (one on each side of the body ring) to rotate about the central ring using servo motors. Each ring might accommodate a base rod 123 and robotic cutting arm. In this aspect, outer ring 122, absent a base rod, may include space 114 for a battery and computing circuitry 113, including all components mentioned above with respect to control arm 121. In one aspect, separate cutting devices might be separately controlled using a same application in a remote network setting.

In another aspect the robotic unit may have control circuitry within the base unit, and the robotic arm might only include, aside from joint actuators and cutter linkage, a video camera, a wireless transceiver, and electronics for streaming the live video to a ground unit or mobile interface to an operator using the displayed video to position the cutter. The camera may be placed close to the cutter, so that good viewpoints are possible, that include the stems to be cut through ?? the edge of the cutter itself.

Robotic body 116 ascends and descends a tree using a plurality of motorized wheels 111, wherein each wheel is interdependently powered using a DC motor 109, and is held against the tree trunk using a torsion spring 110. Wheel brackets, torsion springs and DC motors are not clearly visible in this view, but are illustrated and described in more detail elsewhere in this specification. Torsion springs 110 may be flexible elastic tethers that may store mechanical energy when twisted to support the robotic body unit 116 against the trunk of a tree during climbing. Wheels 111 provided in the circular body 112 enable the body unit to climb up and down a trunk of a coconut tree, or other smooth tree trunk. Wheels 111 are driven by DC motors 109. The base rod connection to body 116 enables the flexible arm unit 102 to rotate about the circumference of the coconut tree trunk to separate coconuts hanging at virtually any orientation. In one aspect the power supply for DC motors and servomotors may be from 230V A/C mains or via a rechargeable battery. In one aspect machine 100 may perform additional tasks not relative to harvesting, such as, for example, spraying pesticides or trimming dead, infected or dying fronds.

Figure 2:
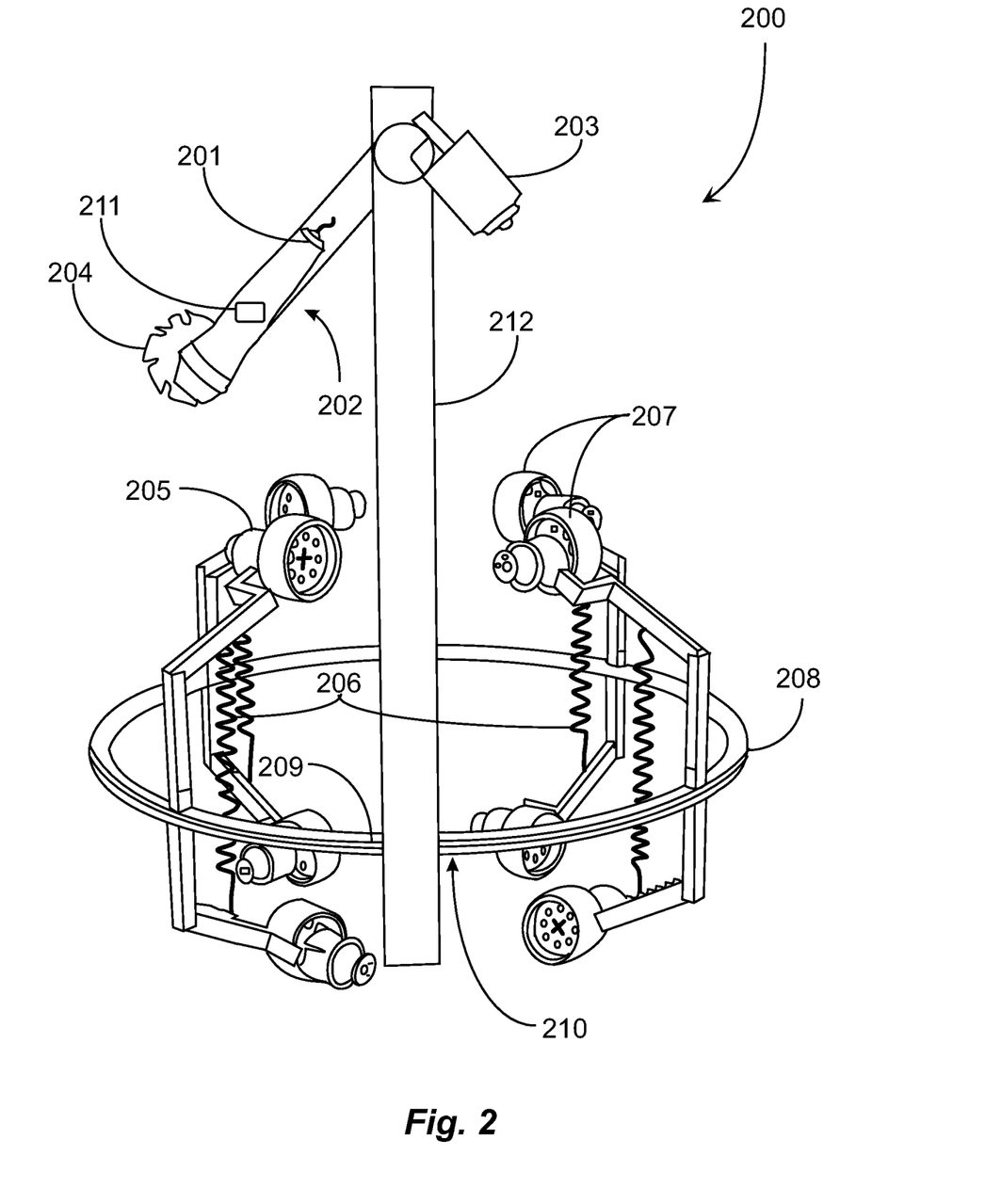
FIG. 2 is another view of the robotic harvester of FIG. 1.

FIG. 2 is an elevation view depicting a variation of the robotic harvester of FIG. 1. In this alternative example, robotic harvester 200 includes a robotic arm 202 and a robotic body unit 210. Robotic body 210 has connection to robotic arm 202 via an extendable link 212, which may be analogous to base rod 123 of FIG. 1. Robotic arm 202 may include a base arm unit and a control unit as previously described. Common components between the arm variations may include a base rod, links, joints, motors, actuators, joint detecting sensors, and an end effector. The control portion of the robotic arm may include a micro controller, motor drivers, joint detecting sensors, a power unit, a wireless interface and a processing unit that enables an operator using a control application from a remote station or device to program the robotic arm and control the motion actuators and motors accordingly.

Robotic arm unit 202 further includes a wireless camera 201, a DC motor 203 and a cutter 204. The wireless camera 201 can be attached to the flexible arm unit 202 and is used to capture the live video of the coconut positions and to transfer the video to a ground station using a transmitter in the wireless camera. A contact sensor 211 may be attached to the frame connecting the cutter 104 for sensing the contact of an object, such as a coconut. The cutter 204 may be placed close to the wireless camera 211 to provide a better view of orientation of the coconut to the operator, and the cutter 204 is driven by DC motor 203. The servo motors can be placed at the joints of the robotic arm unit 202 for the flexible twisting of the robotic arm unit.

Robotic body 210 in this embodiment includes a plurality of DC motors 205 for powering wheels 207. Robotic body 210 includes a ring body 208 having a channel or groove 209 to enable circumferential travel of the robotic arm unit about the ring body. In this view torsion springs 206 are provided for applying tension and grip against a tree trunk. Wheels 207 enable the body unit to climb up or down. Arm unit 202 may be carried around the circumference of a tree trunk to reach hanging coconuts. Robotic arm 202 may include up to four degrees of freedom relative to movement, which is like a human arm in articulation. In this example cutter 204 is placed where the human palm would be. Joints in the robotic arm may include servomotors. The joint servomotors may be controlled by actuators or more specifically potentiometers.

In embodiments of the invention tree-climbing machines are controlled by an operator on the ground from a remote station or mobile interface. Command and control signals are transmitted wirelessly using Bluetooth, ZigBee, or another wireless communication protocol. Command signals are initiated by a human operator using a software control application while viewing live video transmitted to the station or mobile device by the wireless video camera. An operator using the control application may send commands for ascending or descending the tree trunk, rotating the body unit left or right around the tree trunk, and extending the base rod or extendable link to reach the height of the coconuts. Furthermore, the control application enables the operator to control movement of the robotic arm by servo motor at each joint to degrees of motion and control the cutter speed and on/off states of the cutter.

Figure 3:
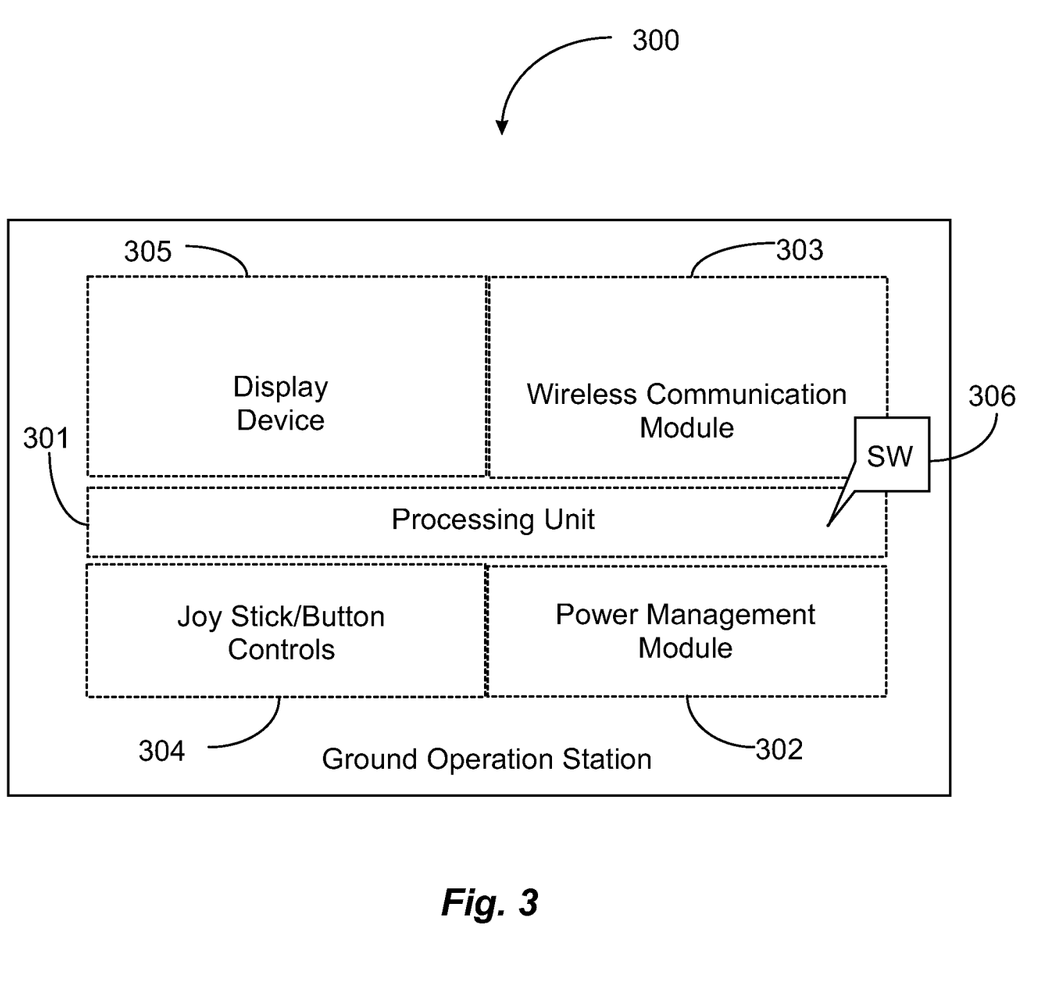
FIG. 3 is a block diagram depicting a ground operation or control station.

FIG. 3 is a block diagram depicting a control station 300. Ground station 300 may be a portable computerized device for manual control of semi-automated and automated bots or drones. Ground station 300 includes, in one embodiment, a computer processing unit (CPU) 301 including one or more forms of memory for storing data and software such as a software application 306 providing instruction and environment for controlling a robotic harvester such as harvester 100 or harvester 200.

Ground station 300 includes a power-management module 302. Module 302 may manage power from a rechargeable battery or battery set. Ground station 300 may also be powered by an AC/DC power source, solar apparatus, etc. Ground station 300 includes a wireless communications module 303. Module 303 manages wireless network communications capability and methodology between it and a robotic harvester having wireless communications circuitry, including receive and send (RX/TX) data capability. Wireless commands to control robotic motion may be transferred from station 300 to a robotic harvester by an operator in real time in response to video sent from such a harvester to ground station 300.

Video from a video camera such as camera 101 of harvester 100 of FIG. 1 may be received at ground station 300 and displayed for an operator on a display device 305. Display device 305 provides a bird's-eye view of coconuts, in this case. The operator may discern from display 305 whether the nuts are ready for harvest, have a disease, and so forth. An operator may also record video and still pictures during operation. Ground station 300 may have a user interface panel 304 that includes at least one joy-stick control or buttons. Station 300 may be located anywhere within wireless communications range of the robotic harvester with which it is paired. Ground station 300 may be used to control more than one harvester. In one case, interface panel 304 includes physical controls for a user to operate while watching video on display device 305. In another case, the interface panel is a display touch screen and the controls are virtual controls.

Figure 4:
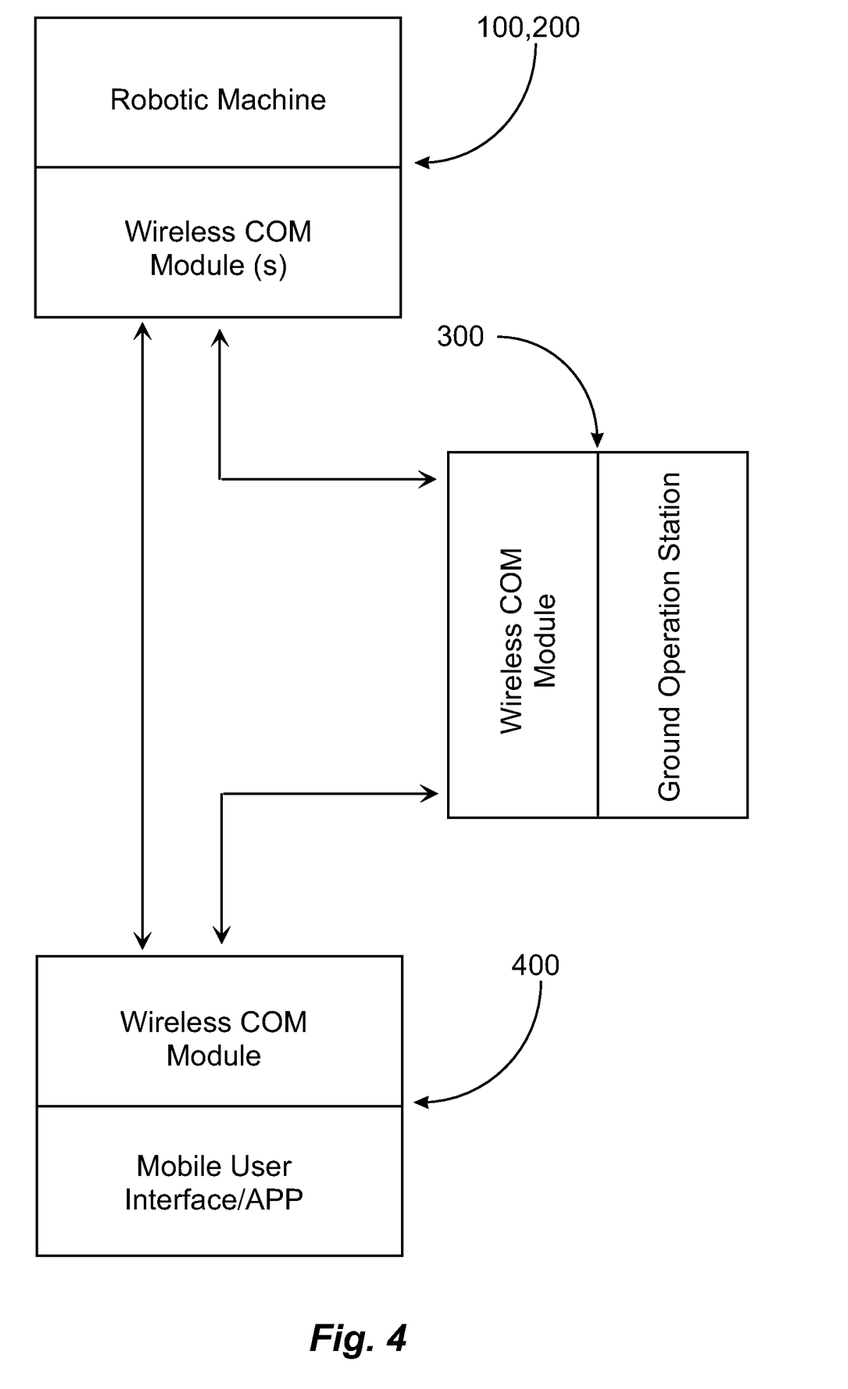
FIG. 4 is a block diagram depicting wireless communication between a robotic harvester, a ground station, and a mobile user device according to one embodiment of the invention.

FIG. 4 is a block diagram depicting wireless communication between robotic harvester 100, or 200, ground station 300, and a mobile user device 400 according to one embodiment of the invention. In one embodiment a robotic harvester such as harvester 100 or 200 can be operated from a mobile computing device such as device 400. Device 400 may be a smart telephone, or a pad device, for example. In one implementation, mobile device 400 may connect wirelessly to ground station 300 and may remotely operate a harvester such as harvester 100 or 200 by extension, using a mobile application that provides the operator of the mobile device video feed from the harvester received at the ground station then transmitted to the mobile device operator.

The mobile application may include all the control options that are required to operate a harvester through the ground station or, a mobile operator may connect to and retrieve those options from the ground station. In another embodiment, a user operating mobile device 400 may control a robotic harvester such as harvester 100 or harvester 200 directly without the aid of a ground station or more particularly in place of a ground station 300. In one implementation the mobile device may be a gaming machine having one or more physical control buttons and or a physical joy stick.

Figure 5:
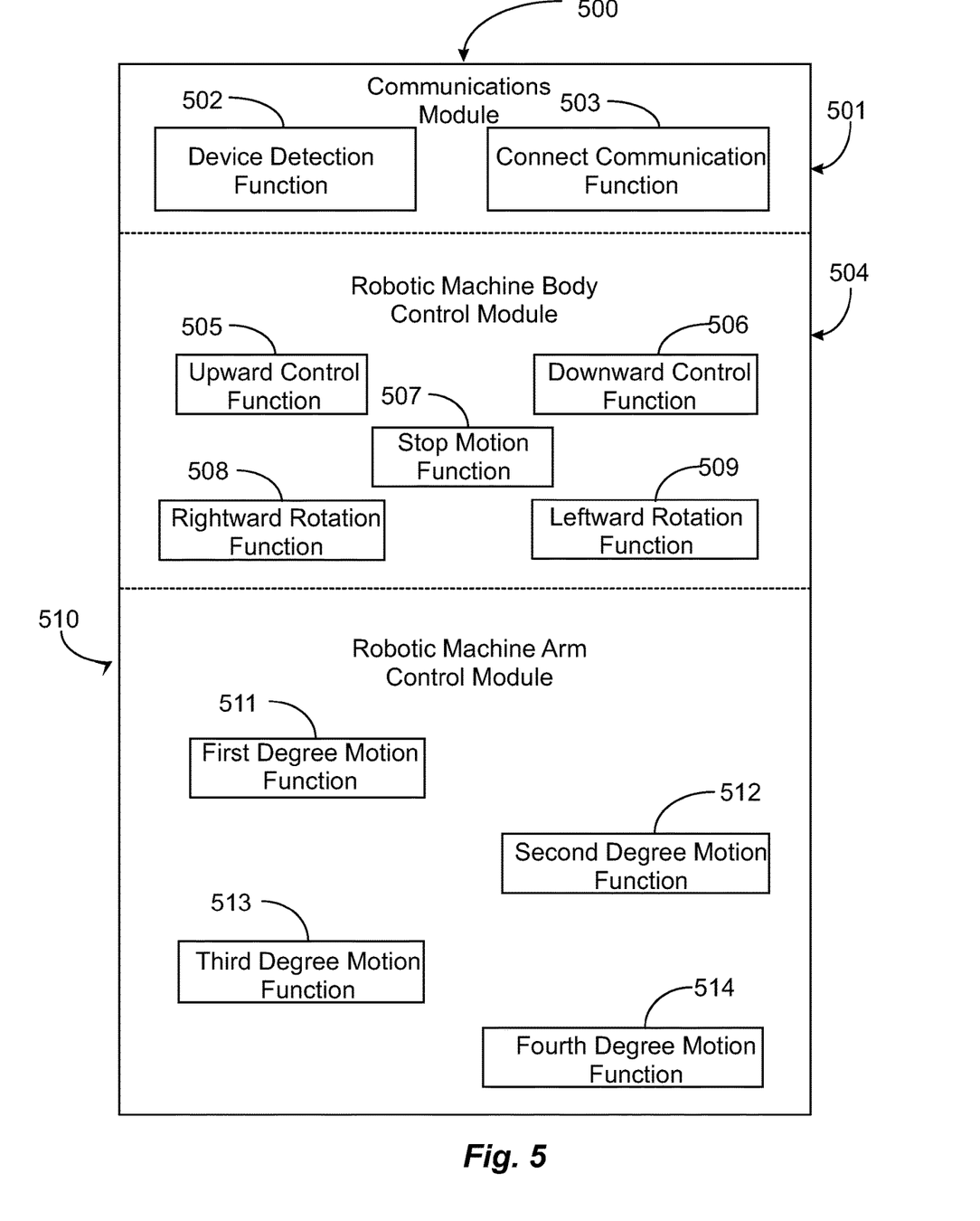
FIG. 5 is a block diagram depicting interactive controls that control the robotic machine body and the robotic machine arm of the robotic harvester.

FIG. 5 is a block diagram depicting controls of an interactive application 500 that may be used to control a robotic machine body and a robotic machine arm of a robotic harvester. Application 500 may be hosted on a ground station such as ground station 300 of FIG. 3, or it may be hosted on a mobile device such as a smart phone having connection to a ground station or directly to a harvester robot. Application 500 minimally includes a communications module 501. Communications module 501 has a function 502 for device detection. Device detection function is a wireless communications function such as a Bluetooth function or ZigBee function which may recognize another wireless device when it is within detection range. Module 501 further includes a connect function for forming a working wireless connection (forming a handshake) with another node (harvester robot) on a network.

Application 500 includes a robotic machine body control module 504. Module 504 is adapted for enabling a mobile operator control over the climbing apparatus of the robot harvester to aid in getting close enough to the coconuts to harvest them. Control module 504 may include an upward mobility control function 505 enabling an operator to drive the robotic harvester body up a coconut tree trunk. Control module 504 may include a downward mobility control function 506 enabling an operator to drive a robotic harvester body down the tree trunk. The associated command options may include those for correcting wheel orientation and for controlling wheel motion (rotation) by DC motors.

Control module 504 includes a function 507 for stopping motion of the wheels. Control module 504 includes a function 508 enabling an operator to rotate the body around the tree trunk to the right and a function 509 enabling leftward rotation of the body around the tree trunk. Such rotation may be initiated by an operator viewing video of current robotic arm position where rotation of the arm around the tree trunk may be required to get close enough to the coconut(s) for harvest. Furthermore, one or more additional motion-control functions, such as for extending or detracting a base rod to which the robotic arm is mounted, may be provided in control module 504.

In this example application 500 includes a separate motion control module 510 for enabling an operator to control the robotic machine arm. Controlling the robotic arm may include controlling position of the arm and controlling the camera and DC motor of the cutter. Servo motors may be placed at each joint and may be controlled to four degrees of freedom of motion at the left or right side. Arm control module 510 includes a first-degree movement function 511, a second-degree movement function 512, a third-degree motion function 513, and a fourth-degree motion function 514. This should not be construed as a limitation to practice of the invention as more than four degrees of motion freedom are possible. Each function may be configured to move arm parts both in right and left side directions.

To further exemplify, first degree motion function 511 may be configured for moving the robotic arm both in left and right directions and at one degree of freedom. More particularly, the first-degree motion function 511 can be configured to moving the base (servomotor 108, FIG. 1) of the arm joint both in right side and left side direction. In the same fashion the second degrees motion function 512 can be configured for moving the arm both in left and right direction at two degrees of freedom. More particularly, the two degrees motion function 512 can be configured for moving the arm joint (servomotor 107, FIG. 1) that connects the base and the cutter part of the arm both in right and left side direction.

Function 513 for example, may be configured for moving the arm both in left and right direction at three degrees of freedom. More particularly, for moving the arm (servomotor 106, FIG. 1) that is connected to the cutter 104 both in right side and left side direction. Likewise, fourth degree motion function 514 can be configured for rotating the cutter 180° at four degree of freedom. More particularly for rotating the cutter part of the arm (servomotor 105, FIG. 1) along a 180° angle of rotation. These functions are depicted as exemplary options in mobile App interface 500.

One with skill in the art of robotics may appreciate that other motion functions may be provided to different degrees and directions of movement without departing from the spirit and scope of the present invention. For example, the camera (camera 101, FIG. 1) may include a joint and one or more servo motors to change the camera angle or direction of view. A version of application 500 may be analogous to SW 306 of FIG. 3 or it may be hosted by a remote computing device such as a smart phone, a laptop, or a gaming box or device. In one embodiment, the application is hosted on the ground operation station such as SW 306. In a variation of this embodiment another application may be operated by a mobile computing device as described and may be adapted as an extension application having access to the ground operation station and the resident application. In still another embodiment, the control application is hosted on a mobile computing device and communicates directly with the robotics, obfuscating the ground station.

Figure 6:
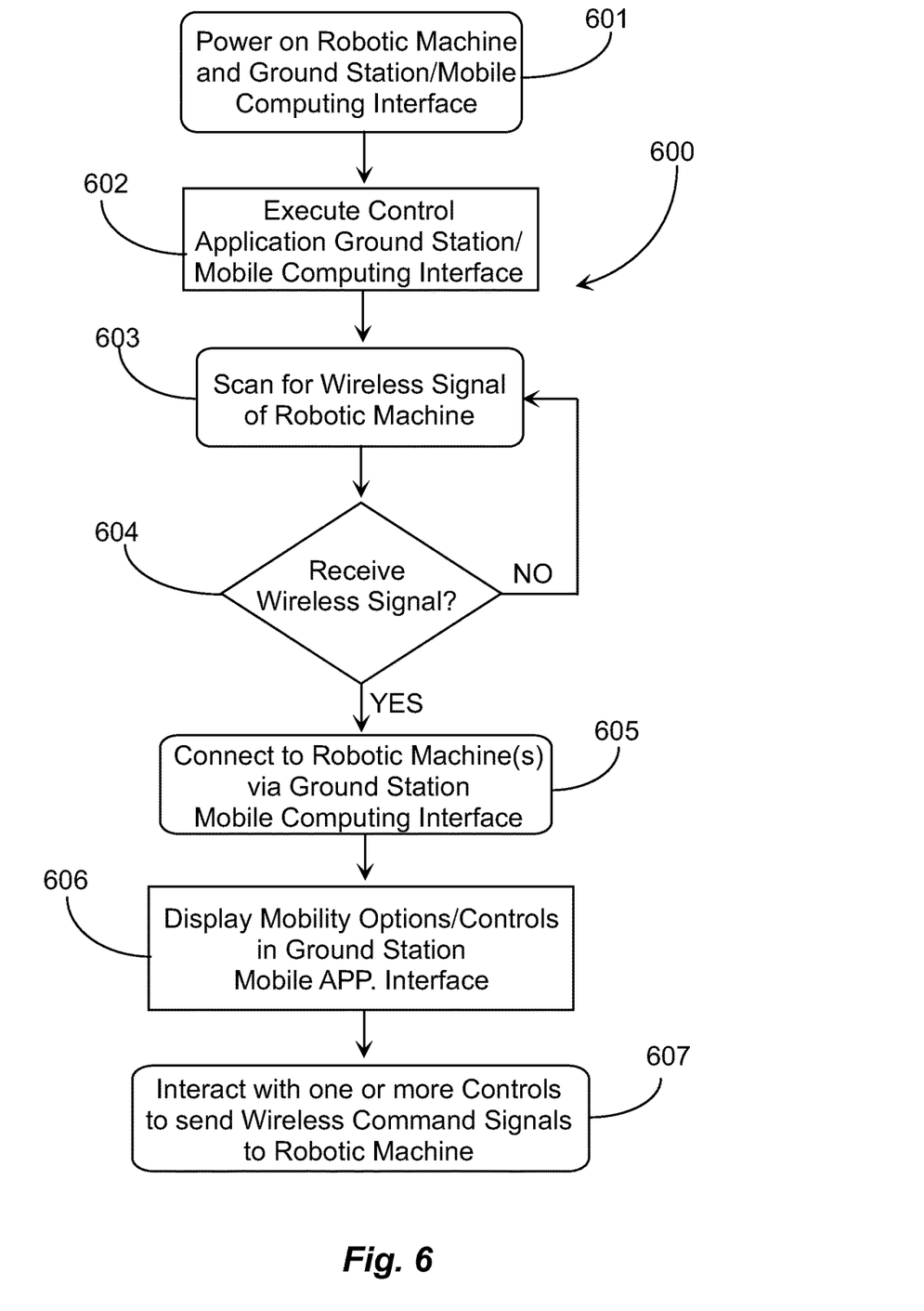
FIG. 6 is a process flow chart depicting steps for booting and operating a robotic harvester from a remote device using a control application.

FIG. 6 is a process flow chart depicting steps for operating a robotic harvester from a remote computing device using a control application. At step 601, a user may power on the robotic machine used to harvest and a ground station or remote mobile interface (smart phone) used to remotely control the robotics. In one aspect as described further above, all three components, robotics, ground station, and mobile interface device are used.

At step 602, the user may execute a control application from either the ground station, a mobile computing device, or both (extension embodiment). At step 603, the application scans for a wireless signal of the robotic machine(s) using Bluetooth, ZigBee, or another wireless protocol having a node detection signal protocol.

At step 604, it may be determined if a signal was received at the control station or mobile interface. If a signal was not received at step 604, the process loops back to step 603 until a signal is found. If a signal is received at step 604, the control application may connect to the robotic machine(s) at step 605 via the ground station or mobile interface (computing device) if used instead of the ground station. In one aspect an additional step is added between steps 605 and 606 for connecting a mobile computing device with a control application extension to the ground station, the ground station having established connection to the robotics wherein remote control through a control application extension is achieved with the user operating the mobile computing device running the extension application, the user controlling the robotics through the main application running on the ground operation station.

At step 606 the robotics controls including mobility options or functions may be displayed for an operator on the ground station or on the mobile device running a control application extension. In one aspect the controls are physically operated joy stick, buttons, sliders, or other physically operated controls at the ground station or on a remote gaming machine having physical controls that are programmable. In one aspect a user may operate robotics using a keypad or keyboard on board or connected to a mobile computing device.

It is noted herein that in step 606 video taken by one or more cameras associated with the robotics may be transmitted and displayed at the ground station or on a mobile computing device display. Based on what the user observes in the video feed, the process moves to step 607 where the user may interact with one or more controls (physical and or displayed) to send wireless commands to the robotic machine(s) to initiate and manage harvesting and other related tasks.

It is also noted that steps are a collection of operations executed in a logical flow representing a sequence of operations that may be implemented in hardware, software, firmware, or a combination thereof. The order in which the method is described is not intended to be construed as a limitation. Steps may be added subtracted or combined or executed in different order to implement the method, or an alternate method. In the context of software, the operations represent computer instructions that, when executed by one or more processors, result in hardware performance of the represented operations.

Figure 7:
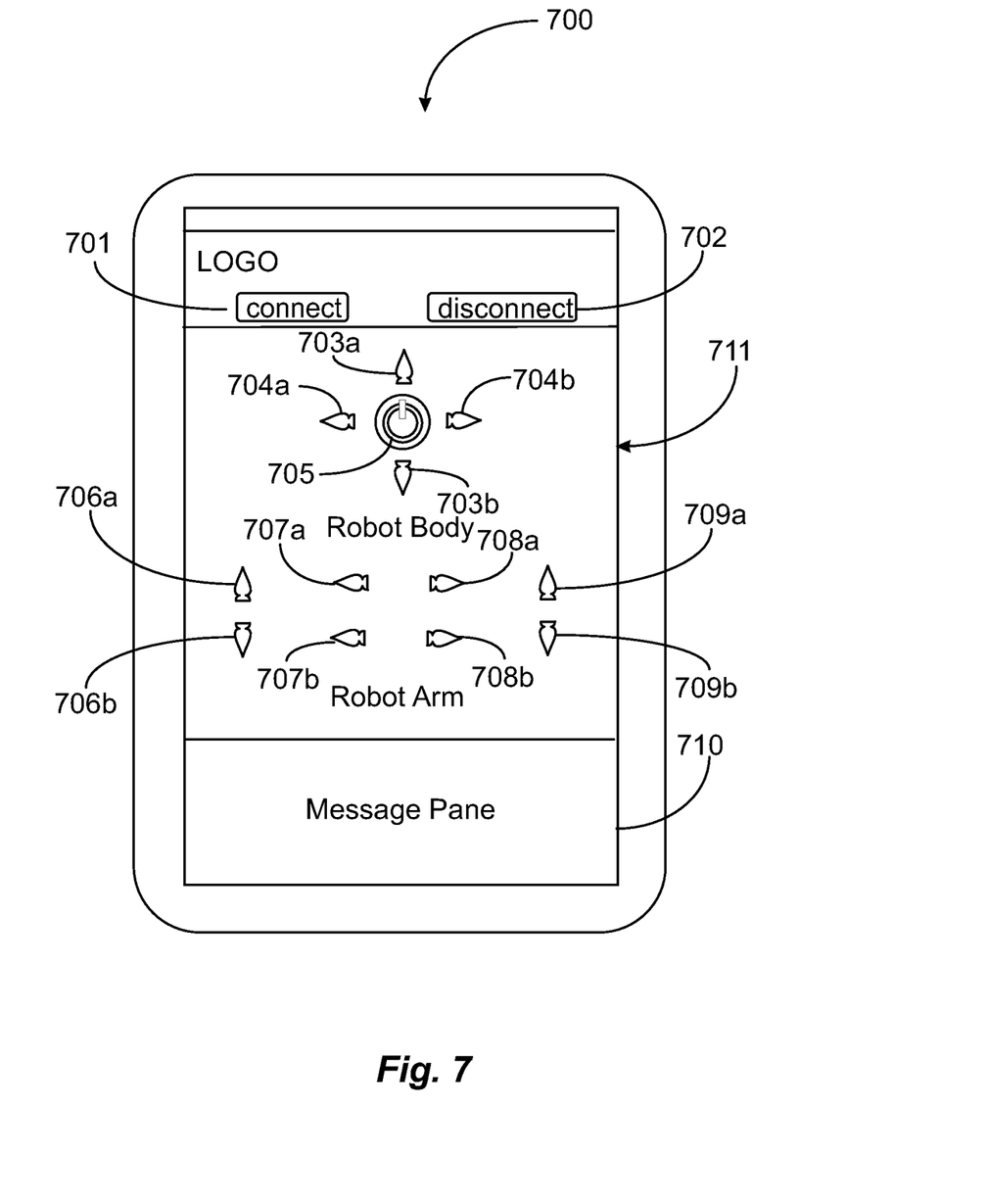
FIG. 7 is an exemplary view of a smart phone display of a control application for controlling functions of a robotic harvester according to an embodiment of the invention.

FIG. 7 illustrates a smart phone 700 with an application display 711 for controlling motion of a robotic harvester according to an embodiment of the invention. Smart phone 700 or a like computing device may be used with or without a ground station to control a robotic harvester. In one embodiment a ground station may be a hub that is connected to a plurality of harvester machines wherein users operating devices such as smart phone 700 may control one or a few of the plurality of robotic harvesters all through a single ground station operational hub.

Smart phone 700 has a processor and wireless communications capability and a display. An application for controlling a robotic machine may be executed from smart phone 700, and wireless communications may be established between the phone and a ground station or robotic machine directly. A robotic control option user interface 711 is displayed on smart phone 700. Interface 711 includes a provider logo, a connect button and a disconnect button for connecting to or disconnecting from a ground station or a robotic harvester.

In this implementation, a set of controls is provided and displayed for enabling a user to drive a robot body for climbing a tree trunk and harvesting coconuts, for example. A control option 703a is displayed for driving the robotic body up a tree trunk. A control option 703b is provided and displayed for driving the robot body down a tree trunk. A control option 704b is provided for rotating the cutting arm left around the tree trunk. A control option 704b is provided for rotating the cutting arm right around the tree trunk. A control option 705 is provided and displayed for stopping all motion. Other movement control options might also be provided without departing from the spirit and scope of the invention.

A second set of controls is provided and displayed for controlling the robotic cutting arm. A left side one-degree movement option 706a and a right side one-degree moment option 706b are provided. A left side two-degree movement option 707a and a right side two-degree movement option 707b are provided. A left side three-degree movement option 708a and a right side three-degree movement option 708b are provided. A left side four-degree movement option 709a is provided and a right side four-degree movement option 709b is provided.

A message pane 710 is provided for receiving and displaying messages addressed to the smart phone. In a preferred embodiment, live video camera stream is available and may be viewed on smart phone 700 in the same display place as the control options. For example, a video window may pop up and may size itself to fit within the display space incorporating the movement control options. In one embodiment where video is sent to a ground station, a video stream may be displayed on one display while the controls (if virtual) may be displayed in a separate dedicated display screen. On a mobile computing device, a display may be divided to show, for example the video feed in the top portion and the controls in the bottom portion of the display footprint. In one embodiment a peripheral display device such as google glass, or a head-mounted display might be used to watch video and controls may be provided on a separate peripheral device operated with either or with both hands of the user.

Message pane 710 may display a welcome message, error messages, connection status, and any text instruction related to the motion controls such as what they are and how to use them. Message pane 710 may also double as a video display window. When a user clicks a button, the app generates a respective feedback and displays on the interface device. The feedback might be related to the movement of the body when the body is controlled and details of the servos of the robotic arm if robotic arm is controlled and so on. In an exemplary embodiment and according to the option selected by a user, the machine unit may perform the action.

An exemplary action might be, for example, if the option of moving the robotic body upward is selected causing the robotic body unit to move in an upward direction of the coconut tree. Once in range to cut, the option of two degrees movement of arm unit in left side direction may be selected, then the arm unit may move the joint that connects the base and cutter part of the arm in a left side direction. If the operator wants to hold the machine unit in the desired position immediately, then the operator might select hold-on position or stop movement option. The option for connect button 701 can establish a connection between the wireless device/smart phone and the machine unit at the ground station. Similarly, the option for disconnect button 702 can disable the connection between the wireless device/smart phone and the machine unit at the ground station. According to the option selected the mobile App may send a signal to the machine unit to perform the tasks instead of through a ground station.

It will be apparent to one with skill in the art that the robotic harvester system and control applications of the invention may be provided using some or all the mentioned features and components without departing from the spirit and scope of the present invention. It will also be apparent to the skilled person that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A harvesting system, comprising:
   a climbing unit with a circular body surrounding a trunk of a tree, the circular body having remotely-driven traction wheels within the circular body, the wheels bearing on the trunk from different directions, and first control circuitry, including wireless communication circuitry, for receiving control signals and driving the traction wheels;
   an upwardly extending post joined to the circular body of the climbing unit, external to the body, the post being telescopic to be extended upward to an upper limit or retracted downward to a lower limit;
   an articulated arm extending from the upwardly-extending post at an upper extremity, the articulated arm comprising a plurality of jointed segments and a cutting implement at an extremity of the articulated arm away from the upwardly-extending post, and second control circuitry, including wireless communication circuitry, for receiving control signals articulating the arm and positioning the cutting implement; and
   a video camera mounted to the articulated arm in proximity to the cutting implement, focused on the cutting implement, wherein the articulated arm, cutting implement, video camera, and climbing unit comprise a first controllable harvesting robot; and
   a computerized portable control station having a display screen and executing coded instructions, and a user interface having inputs operable to control driving the traction wheels of the climbing unit, the articulation of the articulated arm, and the cutting implement;
   wherein video streamed in real time from the video camera is displayed on the display screen, and a user viewing the video display operates the inputs to position the cutting implement to cut a stem of a fruit or nut in the tree.

2. The harvesting system of claim 1 wherein the inputs are electro-mechanical inputs.

3. The harvesting system of claim 1 wherein the inputs are virtual inputs displayed on a touch screen.

4. The harvesting system of claim 1 wherein the upwardly extending post is joined to the circular body by a mechanism enabling the post to be repositioned around the circumference of the circular body, and the user interface comprises inputs for controlling the movement of the upwardly-extending post around a circumference of the circular body.

5. The harvesting system of claim 1 wherein the video camera is mounted to the articulated arm by a mechanism enabling the video camera to be aimed within a variety of viewpoints, and wherein focus is adjustable, and the user interface comprises inputs for controlling the viewpoint and focus of the video camera.

6. The harvesting system of claim 1 wherein the computerized portable control station comprises inputs for controlling elements of at least two controllable harvesting robots, each engaged at a different tree, the user interface having inputs for selecting an individual one of the harvesting robots to control.

7. The harvesting system of claim 1 wherein the computerized portable control station is a smart telephone or computerized pad device.

* * * * *